United States Patent [19]

Bottoms, Jr. et al.

[11] Patent Number: 5,195,158
[45] Date of Patent: Mar. 16, 1993

[54] TIGHT BUFFERED FIBER OPTIC GROUNDWIRE CABLE

[76] Inventors: Jack Bottoms, Jr., 12090 Lonsdale La., Roswell, Ga. 30075; Charles L. Carter, 350 Singletree Trace, Alpharetta, both of Ga. 30201

[21] Appl. No.: 649,612

[22] Filed: Feb. 6, 1991

[51] Int. Cl.$^5$ .......................... G02B 6/00; G02B 6/36
[52] U.S. Cl. .................................................. 385/105
[58] Field of Search ...................... 350/96.23; 385/100, 385/103, 104, 105, 106

[56] References Cited

U.S. PATENT DOCUMENTS

| | | | |
|---|---|---|---|
| 32,374 | 3/1987 | Dey et al. | 350/96.23 |
| 4,078,853 | 3/1978 | Kempf et al. | 350/96.23 |
| 4,359,598 | 11/1982 | Dey et al. | 174/40 R |
| 4,416,508 | 11/1983 | Dey et al. | 350/96.23 |
| 4,491,386 | 1/1985 | Negishi et al. | 350/96.23 |
| 4,491,387 | 1/1985 | Dey et al. | 350/96.23 |
| 4,497,164 | 2/1985 | Dotti et al. | 57/6 |
| 4,757,675 | 7/1988 | Oglesby et al. | 57/6 |
| 4,775,213 | 10/1988 | Kitayama | 350/96.23 |
| 4,784,461 | 11/1988 | Abe et al. | 350/96.23 |
| 4,801,192 | 1/1989 | Wehner | 350/96.23 |
| 4,807,962 | 2/1989 | Arroyo et al. | 350/96.23 |
| 4,865,415 | 9/1989 | Kitayama | 350/96.23 |
| 4,944,570 | 7/1990 | Oglesby et al. | 350/96.23 |

FOREIGN PATENT DOCUMENTS

| | | |
|---|---|---|
| 00766637 | 4/1983 | European Pat. Off. |
| 0146757 | 11/1984 | European Pat. Off. |
| 0328409 | 8/1989 | European Pat. Off. |
| 58-59507 | 4/1983 | Japan |
| 58-59508 | 4/1983 | Japan |
| 1453402 | 10/1976 | United Kingdom |
| 1598438 | 1/1978 | United Kingdom |
| 2157848A | 10/1985 | United Kingdom |

OTHER PUBLICATIONS

Design and Performance Review of Optical Static Wire "A Second Generation"; Author: Cornelison, et al.; Date: 1986.
Optical Fiber Communications-Principles and Practice; Author: Senior, John M.; Date: 1984.
Fiber Optics Applications in Transmission Line Design at Duke Power Company; Author: Parker, et al., paper; Apr. 1985.
Hitachi OPGW Composite Fiber Optic Overhead Ground Wire; Author: Hitachi Cable, Ltd.; Printed: Apr. 1990.

(List continued on next page.)

Primary Examiner—Akm E. Ullah
Attorney, Agent, or Firm—Jones & Askew

[57] ABSTRACT

A fiber optic groundwire or static cable for use between spaced-apart support towers of an electrical power transmission network, for ground fault protection from lightning strikes and other electrical faults, with an integral fiber optic telecommunications bundle. A bundle of optical fibers tightly enclosed by a pliable thremally insulating strain jacket is firmly affixed into a helically-wound channel within an electrically conductive core. At least one layer of stranded electrical conductors serving as strength members completely surrounds the core. The tight jacketing of the optical fibers by a pliable strain jacket, combined with the firm mounting of the strain jacket within the helical channel of the core, reduces the axial tensional forces on the optical fibers that occur during and after installation of the cable. Also, the cable provides improved fault current carrying capability by utilizing a strain jacket made from a high temperature and thermally insulating silicone-based or ethylene propylene-based material. Because the fiber optic bundles are tight buffered in the strain jacket and the strain jacket is tightly affixed in the channels of the core rather than in loose in the strain jacket, the cable accommodates more optical fibers per unit area of channel than prior art "loose tube" construction, which allow the fibers to move relative to one another and relative to the cable core.

37 Claims, 4 Drawing Sheets

OTHER PUBLICATIONS

Cable on Three Continents; Author: Phillips Cables, Inc.; Date: 1987.
Optical Static Wire; Author: Reynolds/Ericsson; Date: 1986.
Overhead Line Conductors Containing Optical Fibers—a New Approach To; Author: Alexander, Phillips; Date 1984.
Alcoa Fujikura Ltd.-Optical Fiber Cables and Systems; Author: Alcoa Fujikura Ltd.; Date: 1986.
Reynolds Ericsson-Fiber Optic Cable Products; Author: Reynolds Ericsson; Date: 1986.
Alcoa Fujikura Ltd. Optical Fiber Cables and Systems; Author: Alcoa Fujikura, Ltd.; Date: 1986.
Optopia-Composite Fiber-Optic Overhead Ground Wires OPGW's; Author: Sumitomo Electric; Date: 1984.
Fiber Optic Cable; Author: Pirelli Cable; date unknown.
Fibergard—Optical Static Wire; Author: Reynolds Ericsson.
Composite Fiber-Optic Ground Wire; Author: Matsubara et al; Date: 1986.
LightWire—The Ultimate in Loose Buffer V Technology . . . From Kaiser, Author: Kaiser Aluminum.
Appendix A-Optical Requirements; Author: Alcoa Fujikura Ltd.; Date: 1989.
Reynolds/Ericsson Fiber Optic Cable Products; Author: Reynolds/Ericsson; Date: 1985.
Optical Ground Wire; Author: Reynolds Metals; Date Sep. 24, 1985.
Alternative Approaches to Optical Fibre Cable Making; Author: Slaughter, et al., Date: 1977.
Optical Fibre Packaging in Loose Fitting Tubes of Orientated Polymer, Author: Jackson, et al., Optical; Date: Mar. 7, 1977.
Optical Fibre Communication; Author: book, Technical Staff CSAT, 1980.
Sumitomo Electric Industries OPGW; Author: Alcan Cable; Date; Feb. 1986.
Composite Fiber-Optic Overhead Ground Wire OPGW; Author: Alcan Sumitomo; Date: 1987.
Improved Composite Fiber-Optic Overhead Ground Wire; Author; Saito et al. (Sumitomo): Date; Sep. 1984.
Long-term Reliability of Optical Fiber Composite Ground Wire; Author; Ogai et al, (Furukawa); Date: 1985.
New Composite Fiber-Optic Overhead Ground Wire; Author: Nishiyama, et al.; Date: 1986.
Development of High Performance Composite Fiber-Optic Overhead Ground Wire; Author: Nagaki, et al.; Date 1986.
Optical Fiber Ground Wire; Author: Bianchi, et al.; 1987.
Development of Optical Ground Wire for 1.55 um Wavelength; Author: Lin et al., (Sumitomo); Date: 1987.
Suitable Design and Characteristic of Optical Ground Wire for 1.55 um Wavelength; Author: Kawasaki et al. (Hitachi); Date 1988.
Optical Ground Wire Design With a Minimum of Dielectics; Author: Schneider, et al.; Date: 1988.
Development of a Composite Fiber-Optic Ground Wire; Author: Kawahira et al.; Date: 1984.
Composite Fiber-Optic Overhead Ground Wire; Author: Igarashi, et al.; Date: 1980.
FOCAS Skylited Product Brochure; Author: FOCAS, Inc.
Optical Static Wire Product Specifications; Author: Ericsson, Production; Date: 1986.
Test Results of the Initial Qualification Testing for Optical Static Wire: Author: Ericsson Light Wire V Fiber Optic Ground Wire; Author: Kaiser Aluminum.
The Focal Point: Author: Siecor.
FIBRAL Delivers Communications and Power in One Fig_3

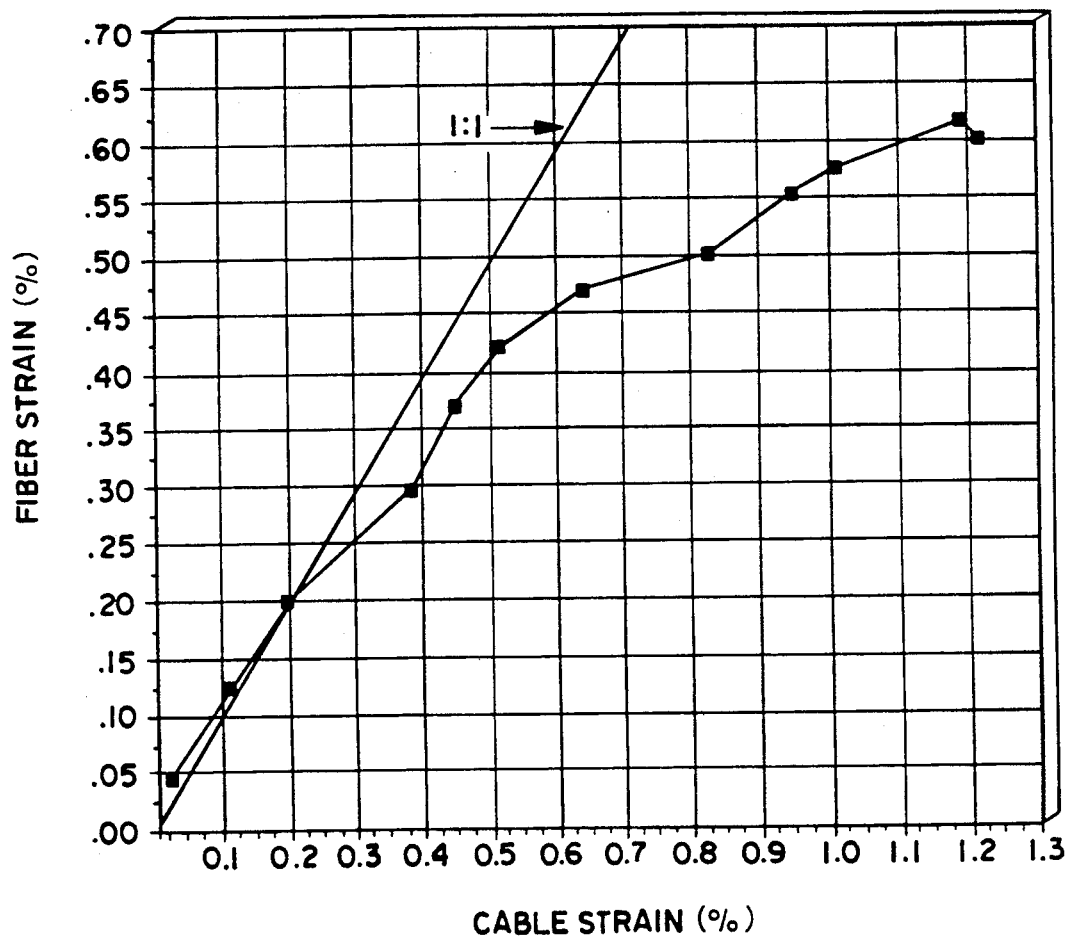
Fig_5

TIGHT BUFFERED FIBER OPTIC GROUNDWIRE CABLE

TECHNICAL FIELD

The present invention relates generally to groundwire cables for use with overhead power transmission lines, and more particularly relates to a ground fault protection cable that functions as both a groundwire and a fiber optic telecommunications cable used with overhead electrical power transmission lines suspended between spaced-apart support towers or pylons.

BACKGROUND OF THE INVENTION

An electrical power transmission network typically comprises an electrical power generation source that is connected to an electrical power distribution network by overhead electrically conductive cables suspended between spaced-apart support towers that are installed along electric utility right-of-ways. These electrically conductive cables are susceptible to lightning strikes because of the conductive characteristic of the cabling and the height of the support towers. Cables called "groundwires" are typically suspended between the spaced-apart support towers and above the base electrical conductors of the power transmission network to protect from the high current surges presented by direct or near-by lightning strikes. These groundwires, also called shield wires or earth wires, provide a path for the high current transients generated by lightning strikes within the proximity of the groundwire to safely discharge via the groundwire, the local support towers, and the ground.

The electric utility right-of-ways for overhead electrical power transmission lines often provide an attractive path for the installation of overhead telecommunications cables. Because the communications content of light signals carried by optical fibers are not affected by the high voltage and current environment typically found within an electrical power transmission network, groundwire cables are often combined with an optical fiber or, more often, a bundle of optical fibers, to efficiently provide lightwave communications via the existing overhead transmission network. More specifically, a bundle of optical fibers are typically mounted within an electrical conductor to form a groundwire cable that is installed between spaced-apart support towers and above the electrical transmission lines. In this manner, the groundwire cable functions as both a groundwire and a telecommunications cable and thereby enables the existing electric utility right-of-way to be used for telecommunications.

A dual-purpose groundwire cable, which provides both ground fault protection and a telecommunications link, must be tolerant of the high tensional and vibrational forces presented by the overhead cable installation. More specifically, both the electrical conductor and, to a lesser extent, the bundle of optical fibers provided by the dual-purpose groundwire must be capable of withstanding the stresses presented by the overhead groundwire cable installation. Optical fibers sometimes contain defects, known as Giffith flaws, that are undetectable by the manufacturer. The flaws can lead to communications-interrupting fiber breaks upon the application of sufficient strain on the fiber.

Conventional dual-purpose groundwires provide some form of a mechanical mechanism to decouple the conductor strain from the optical fiber strain to relieve any potential optical fiber-damaging stresses during and after installation of the groundwire. In addition, the groundwire cable also must be capable of withstanding the fault currents provided by lightning strikes and the hazards provided by weather extremes, including ice, wind, and rain.

Attempts have been made in the art to protect fibers from tensile stresses by simply twisting them into helices thus increasing their lengths relative to the cable lengths. U.S. Pat. Nos. 3,955,878, 4,388,800, 4,389,088, and 4,491,386 are examples of this approach. Typically, single fibers are laid directly into channels in the cable core so that when the cables are stretched, the extra length of the fibers prevents transmission of cable elongation to the fibers. However, in all of these patents the fibers are free to move relative to the core of the cable.

Another known cable that provides both an electrically conducting ground or static wire and a fiber optic cable is described in U.S. Pat. No. 4,944,570 to Oglesby et al. This cable includes a central core that has one or more helical channels of a given twist direction or lay formed in the periphery of the core. One or more tubes containing a suitable dielectric water-blocking compound and optical fibers are positioned in the helical channels, one tube per channel. The water-blocking compound is flexible and helps to maintain the position of the fibers in the tube, but allows the fibers to move. The fibers, one or more per tube, are randomly arranged within the tubes and the tubes, the fibers and the channels are arranged in such a way that stresses from cable elongation less than a predetermined value are not transmitted to them, thus providing an elongation window. Finally, the assembly formed of the core and the tubes or tubes is wrapped with metal wires.

Other dual-purpose groundwire cables are described in U.S. Pat. Nos. Re. 32,293 and 32,374 to Dey et al. Several embodiments of the cable in these patents include at least one stranded layer of elongate elements of metal or metal alloy, at least one elongate compartment within and extending throughout the length of the stranded body and, loosely housed in the elongate compartment, at least one separate optical fiber and/or at least one optical bundle.

As in other known approaches to reducing stress on the optical fibers, the fibers in the Dey et al. patents are free to move within the compartment. A greasy material fills the interstices between the stranded layer elements to provide for relative sliding movement between stranded layers and to prevent water from entering the interior of the cable.

In the known fiber optic groundwire cables where the fibers are loosely housed and/or otherwise free to move, the strain that may be imposed upon the installed groundwire conductor is mechanically decoupled from the strain upon the supported fiber optic cable because the fiber optic cable is loosely housed within the cable core; specifically, limited relative movement between the fiber optic cable and the groundwire body can occur upon the application of tensional forces along the groundwire cable. Also, many prior art groundwire cables include a filling compound that surrounds the fiber optic cable mounted within the channel but allows the fiber optic cable to move relative to the groundwire electrical conductor.

Despite the mechanisms provided in the prior art for decoupling the electrical conductor strain from the optical fiber strain, the tensional and vibrational forces upon the typical cable limits the estimated expected lifetime of the optical fibers that form the fiber optic cable within the electrical conductor. Also, the dual-purpose groundwire cables provided by the prior art are also limited by the maximum number of optical fibers carried by the cable because of the loose positioning of the fibers within the electrical conductor—the provision of space for movement limits the number of optical fibers that can be present.

Many optical fibers used for telecommunications today are manufactured with a coating of acrylate to microcracks in the glass fibers formed during extrusion and prevent the incursion of moisture. The acrylate coating on most fibers is extremely thin and provides no cushioning from chafing or from compressive forces generated by contact with adjacent fibers in a bundle or with the surfaces of a channel. Moreover, at temperatures of greater than about 180° C., acrylate melts and the fiber's moisture protection provided by the coating is degraded. Groundwires made with acrylate coated fibers therefore suffer from a relatively low rating of fault current carrying capability, since current above the rating will elevate the temperature and degrade the optical fibers, ultimate resulting in shorter fiber life.

Therefore, there is a need for a dual-purpose fiber optic groundwire cable that demonstrates an improvement in the estimated expected lifetime of the optical fibers located within the electrical conductor. A need further exists for a more efficient dual-purpose fiber optic groundwire cable that carries more optical fibers than can be carried by prior art approaches. In addition, there is a need for a fiber optic groundwire cable that provides an improved maximum fault current capacity. The groundwire cable must be able to withstand the tensional and vibrational forces provided by the typical overhead cable installation, and must be tolerant of extreme temperature ranges and the hazards provided by all kinds of weather, including ice, wind, and rain.

SUMMARY OF THE INVENTION

The present invention provides an improved fiber optic groundwire cable that functions as both a groundwire and a telecommunications cable. The preferred embodiment of the present invention allows packing in more optical fibers in a given space than prior art approaches and exhibits improvements in the estimated expected lifetime of a fiber optic cable by decreasing the axial strain upon the optical fibers cable during and after the installation of the cable and by providing superior thermal insulation of the optical fibers. The invention provides this improved estimated expected fiber lifetime by tightly enclosing a bundle of optical fibers within a pliable strain jacket, and firmly mounting the jacket within a helical channel located along an electrically conducting core.

The tight jacketing of the bundle of optical fibers, combined with the bundle's firm mounting within the helical channel located along the core, provides a novel means for reducing the axial tensional forces upon the optical fibers that occur during and after the suspension of the dual-purpose groundwire between support towers. Moreover, elimination of the space between optical fibers required in prior art "loose tube" designs allows more optical fibers to fit within the channel, thereby increasing the communications capacity of the cable. Furthermore, the material of the strain jacket insulates the optical fibers from temperature extremes caused by high fault currents.

Briefly described, the present invention provides a dual-purpose fiber optic groundwire that includes an electrically conducting core which contains at least one grooved channel that is helically wound along the length of the core conductor. A strain jacket is firmly affixed within each channel such that the strain jacket is positioned completely within the channel. Each strain jacket tightly binds a plurality or bundle of optical fibers such that the optical fibers are protected from weather exposure. At least one layer of stranded electrical conductors encloses the core conductor and bears the axial strain of the cable when supported, thereby providing current carrying capability for the cable and additional protection for the bundle of optical fibers from the harsh effects of ice, wind, and rain.

An important aspect of the present invention is that the strain jacket comprises a pliable, insulating, weather-resistant, and temperature-resistant material that is extruded along the length and about the circumference of a bundle formed by the plurality of optical fibers. In this manner, the enclosed bundle is further protected from environmental hazards and elevated temperatures. Moreover, the pliable material of the jacket tends to buffer the bundle from axial tension upon both the core conductor and the layer of stranded electrical conductors surrounding the core. The strain jacket preferably comprises either a silicone-based material or an ethylene propylene-based material to provide the desired pliability, temperature-resistance, insulation, and weather-resistance characteristics.

Another aspect of the present invention is that the strain jacket is firmly affixed in the grooved helical channel of the core by completely filling the grooved channel containing the strain jacket with a filling compound. The filling compound, which prevents water intrusion into the space occupied by the bundle of optical fibers, preferably comprises a fixing mastic sealant that firmly binds the strain jacket within the channel.

Preferably, the core of a fiber optic groundwire constructed in accordance with the present invention comprises solid aluminum, and the layer of stranded electrical conductors preferably comprises aluminum-clad steel wires to permit the conduction and discharge of any induced currents created by a lightning strike or other electrical fault. Also, each of the plurality of optical fibers typically comprises an acrylate coated optical fiber with a diameter greater than 250 microns, coated with a layer of silicone of about 150 microns. The coating of silicone provides additional radial compressive force absorption and thermal insulation for the optical fiber and its acrylate coating.

Because each fiber in the bundle is coated with a silicone coating, the bundle of optical fibers is tightly bound within the pliable strain jacket, and the strain jacket is in turn firmly mounted within the helical channel located along the core, the bundle of optical fibers is protected from the axial strain upon the core and the layer of stranded electrical conductors. The axial strain upon the core and the layer of stranded electrical conductors is decoupled from the strain upon the bundle of optical fibers effectively. transformation of axial stress by "unwinding" into radial compressive force which is partially absorbed by the material of the pliable strain jacket and partially by the silicone coating on the fibers, all combined to protect the individual fibers as the cable is tensioned during installation and other stresses.

In other words, the tight binding of the bundle within the pliable jacket mounted along the helical channel provides a "spring effect" to reduce strain upon the optical fiber bundle. As axial stresses occur in the cable, for example as the cable expands and contracts in response to temperature changes, the fiber optic bundle experiences a radial strain as the fiber optic bundle tends to "unwind" from inside the helical channel. However, inasmuch as the bundle is tightly bound within the channel and confined within the channel by the windings of conductors about the core, the fiber optic bundle tends to experience a radial compression, which does not affect the optical characteristics or aggravate defects in the optical fibers as much as axial stresses.

Accordingly, tension relief is provided in the radial direction of the helical channel. In this manner, the estimated expected lifetime of the bundle of optical fibers is increased by its protection from environmental hazards and the transformation of axial strain in the cable into radial strain on the bundle.

In contrast to prior art approaches involving loose positioning of fibers within the cable, the tight binding in the present invention of the bundle of optical fibers within the pliable strain jacket permits an increased number of optical fibers within a predetermined bore space defined by the grooved channel. This efficient use of the defined space provided in the present invention is further facilitated by the lack of use of a lubricating gel or a greasy compound within the channel that allows relative movement of the optical fibers and cable core in prior art approaches.

Also, the pliable strain jacket comprising the silicone-based or the ethylene propylene-based material insulates the bundle of optical fibers from the temperature extreme created by a fault current carried by the core and the outer windings of conductor wire during a lighting strike or other electrical fault. Thus, the present invention provides an improved fault current capability because of the material utilized to enclose the optical fiber within each grooved channel has greater insulating capability.

Accordingly, it is an object of the present invention to provide an improved fiber optic groundwire cable that has a greater estimated expected lifetime for the optical fibers.

It is another object of the present invention to provide a miniature fiber optic groundwire cable that has intrinsically superior temperature performance than prior art designs.

It is a further object of the present invention to provide an improved fiber optic groundwire cable that has a greater estimated expected lifetime for acrylate coated optical fibers by thermally insulating the fibers.

It is a further object of the present invention to provide an improved fiber optic groundwire cable having improved environmental protection and increased tolerance for tensional and vibrational forces.

It is a further object of the present invention to provide an improved fiber optic groundwire cable that can withstand the hazards posed in the installed environment of the cable, including wind, rain, lightning, and ice, without compromising the performance characteristics.

It is a further object of the present invention to provide an improved fiber optic groundwire cable that can effectively discharge the induced currents provided by a lightning strikes and other electrical faults while simultaneously providing a communications link via optical fibers.

It is a further object of the present invention to provide an improved fault current rating for a fiber optic groundwire cable that utilizes acrylate coated optical fibers.

It is a further object of the present invention to provide an improved fiber optic groundwire cable having uncompromised mechanical integrity when compared to prior art approaches.

It is a further object of the present invention to substantially increase the number of the optical fibers carried by a fiber optic groundwire cable, without compromising the electrical fault current carrying capacity or the anticipated life expectancy of the optical fibers.

It is another object of the present invention to provide an improved fiber optic groundwire cable that firmly fixes the bundles of optical fibers in the channels of the cable so as to reduce chafing of the optical fibers and prevent ingress of moisture.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 5 illustrates the relation between the optical fiber strain and the conductor cable strain for a 12 fiber embodiment of the present invention.

DETAILED DESCRIPTION OF THE PREFERRED EMBODIMENT

Figure 1:
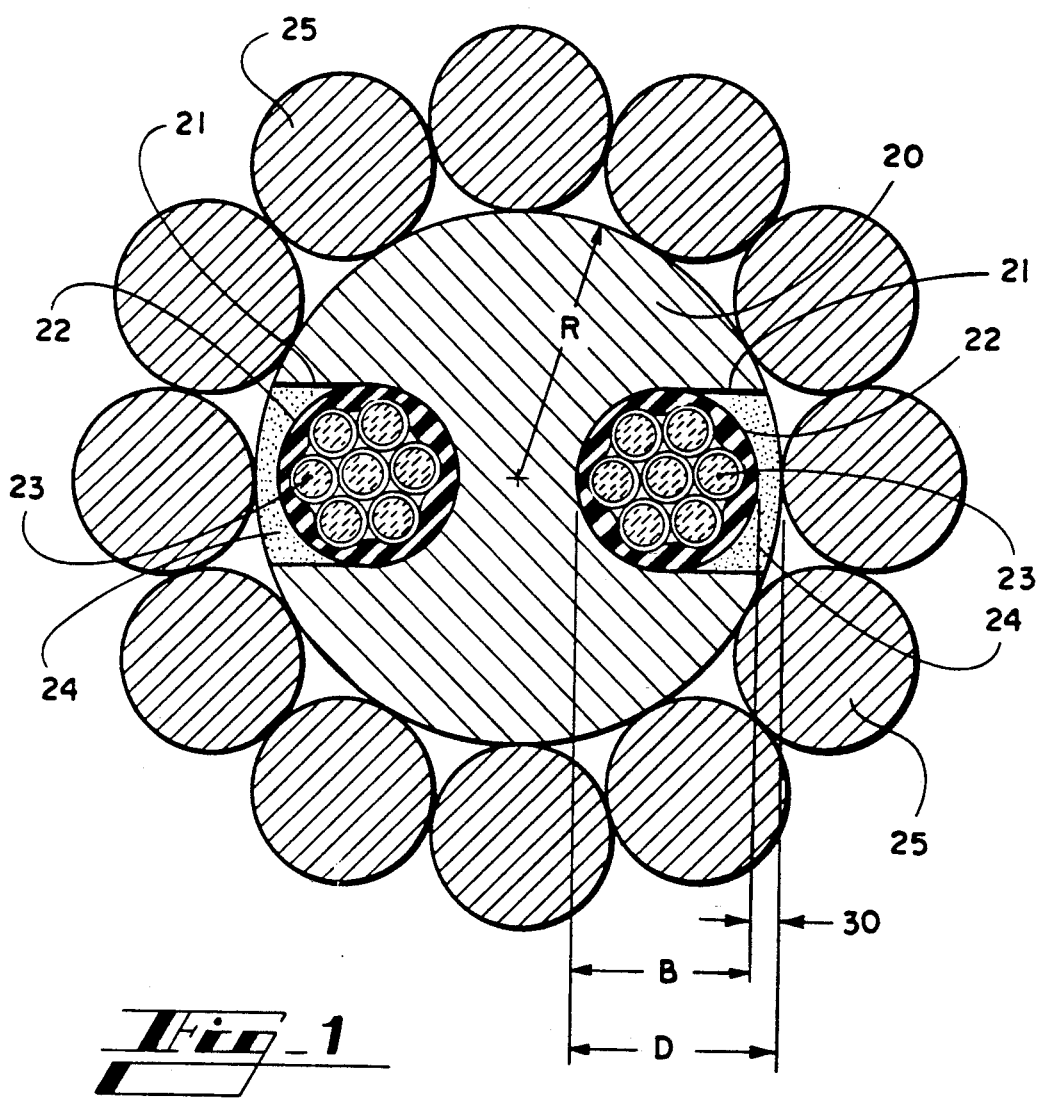
FIG. 1 is a transverse cross-sectional view of a fiber optic groundwire cable constructed in accordance with the preferred embodiment of the present invention that includes two grooved channels.
Figure 2:
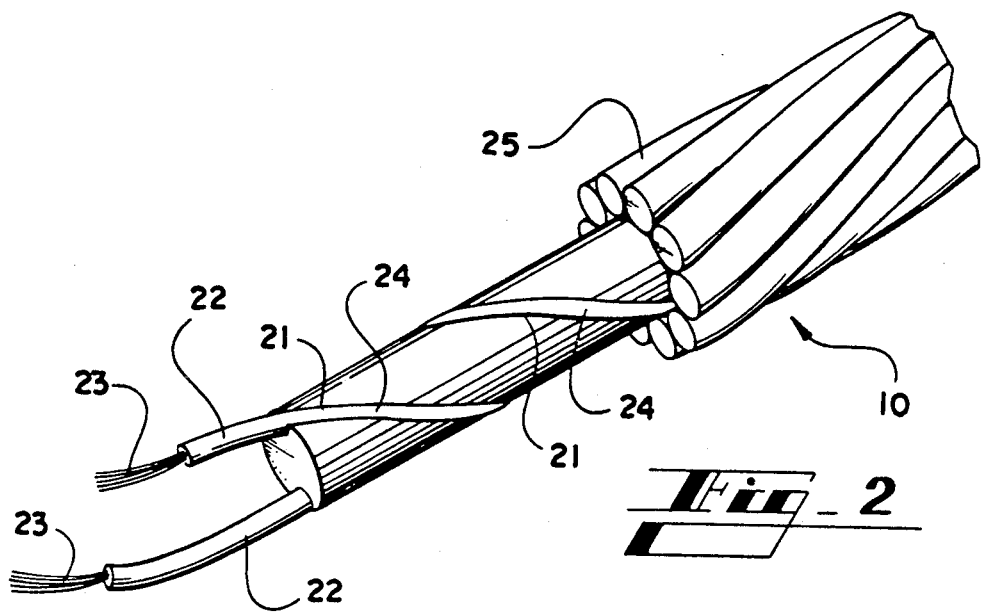
FIG. 2 is a perspective view of the fiber optic groundwire cable of FIG. 1.
Figure 3:
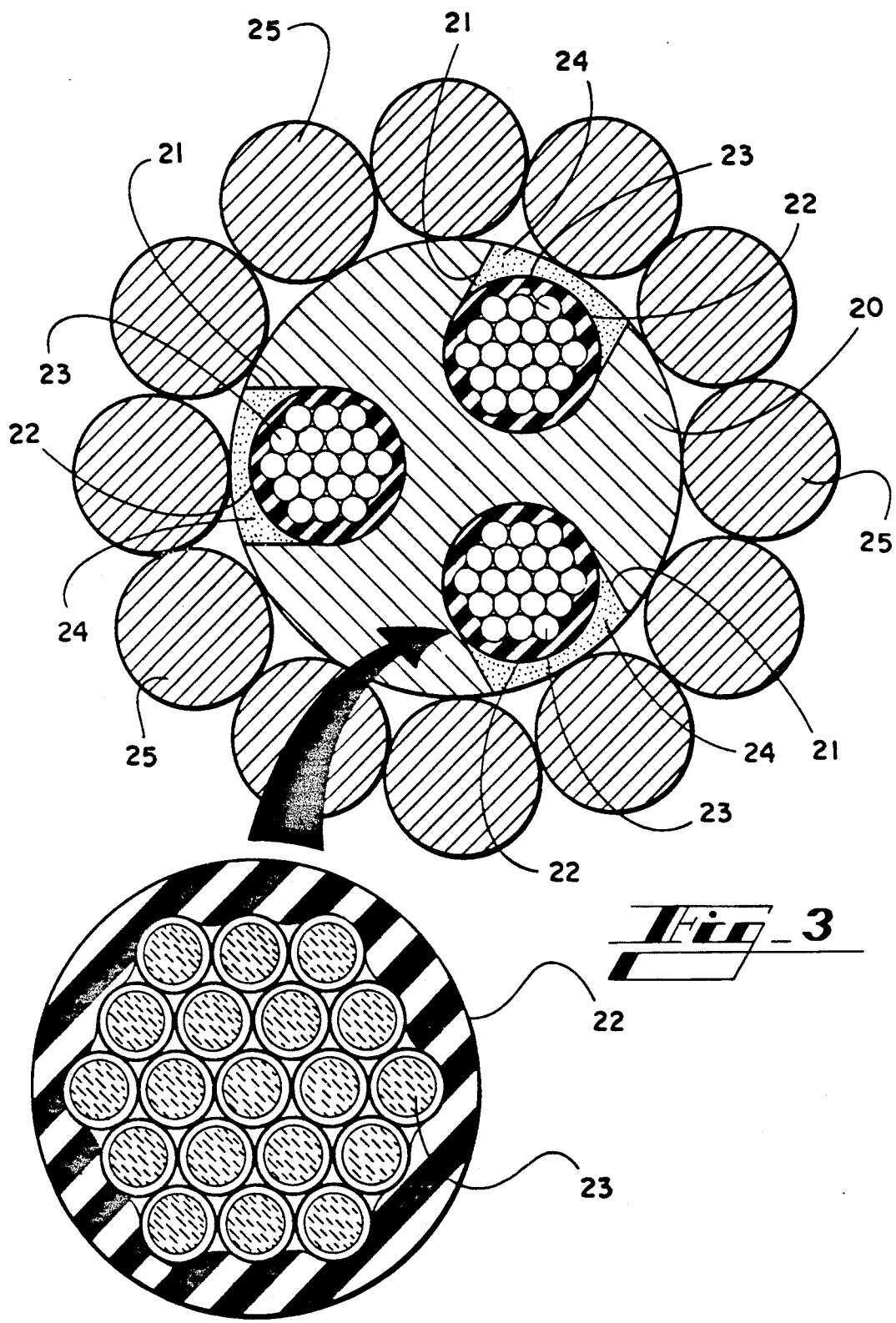
FIG. 3 is a transverse cross-sectional view of a fiber optic groundwire cable constructed in accordance with a second embodiment of the present invention that includes three grooved channels.

Referring now to the drawings, in which like numerals indicate like elements throughout the several figures, FIGS. 1 and 2 provide transverse cross-section and perspective views, respectively, of a fiber optic groundwire 10 embodying the present invention. General speaking, the preferred invention provides an improved overhead optical ground wire using single-mode or multimode optical fibers. The groundwire 10 has tightly bound strain jackets helically applied within a channeled aluminum central member. Each strain jacket contains from 2 to 19 optical fibers. Outside stranding and overall protection for stranded core is in the form of helically applied aluminum clad steel wires and/or 1350 EC-H19 aluminum wires which also serve as the cable strength members. In FIG. 1, the preferred fiber optic groundwire 10 includes a core conductor 20 that contains at least one helically-wound grooved channel 21 which supports a strain jacket 22 that tightly binds a bundle of optical fibers 23. In the preferred embodiment, the core conductor 20 contains two grooved channels 21. As shown in FIG. 3, another embodiment of the invention provides three grooved channels 21. Those skilled in the art, however, will recognize that the present invention is not limited to embodiments providing two or three grooved channels.

At least one layer of stranded electrical conductors or strength members 25 completely encloses the core conductor 20 and thereby also completely covers each jacketed fiber optic bundles 23 tightly mounted within each channel 21.

In the preferred embodiments, the core conductor 20 comprises a continuous channeled solid aluminum or aluminum alloy rod that provides resistance to radial compressive forces and flattening, thereby protecting the fiber optic bundles 23 housed in the channels 21. The core conductor 20 also serves as an electrical conductor for the discharge of fault current generated by a lightning strike or other electrical fault. Typically, the core conductor is a bare rod, extruded with the channels 21. The channelled aluminum rod is twisted into a helix with a right hand lay, with the lay length to conform to the strain jacket lay length.

In two embodiments of the invention, the rod or core 20 has a diameter of 0.297 in (±0.002 in.) for use with twelve No. 10 AWG and ten No. 8 AWG wires forming the strength layer, and a diameter of 0.378 in (±0.003 in.) for use with twelve No. 8 AWG wires as strength members.

The core conductor 20 shown in FIG. 1 contains two grooved channels 21 that are helically wound along the length of the core conductor 20 such that the grooved channels 21 never intersect. The helical winding of the grooved channels 21 are twisted in either a right-hand or left-hand winding direction. Each of the grooved channels 21 is preferably shaped in the form of an elongated semi-circle within the body of the core conductor 20 such that the open end of the elongated semi-circle faces the exterior surface of the conductor 20. Those skilled in the art will recognize that the shape of the each grooved channel 21 is not limited to the semi-circle form; the shape of the channel 21 may include alternative forms, including a V-shaped form.

Each grooved channel 21 contains a strain jacket or tube 22 that is firmly mounted along the length of the grooved channel 21. The strain jacket 22 is affixed and sealed within the channel so as to prevent chafing of the bundle of fibers and prevent intrusion of moisture. The depth (or diameter) D of the grooved channel 21 is preferably sufficient to permit the channel 21 to completely accept and surround the strain jacket 22 within the channel 21, with the outermost exposed portion of the jacket 22 not extending beyond the circumference of the core 20. Preferred embodiments have a diameter D of about 2.5 to about 3.5 mm, with preferred channel diameters being 2.7–3.0 mm. Alternatively, the diameter B of the strain jacket 22 may be made somewhat less than the depth D to provide a region for a layer of protective material 24 of a predetermined thickness 30.

A core filling compound provides the protective material 24 and fills any open space remaining between the surfaces of the grooved channel 21 and the strain jacket 22, to firmly and immovably mount the strain jacket 22 within the grooved channel 21 and prevent water intrusion and migration. The filling compound 24 preferably is a fixing mastic sealant applied to the channels 21 after insertion of the strain jacket 22 but before winding the strength members 25. However, those skilled in the art will recognize that other materials such as hot melt adhesives can be utilized to bind the strain jacket 22 within the grooved channel 21. In addition to firmly binding the strain jacket 22 within the grooved channel 21, the filling compound 24 also protects the strain jacket 22 from the harmful effects of the environment. The filling compound prevents water intrusion and migration. The filling compound preferably is non-toxic and dermatologically safe to exposed skin., chemically and mechanically compatible with all cable components, nonnutritive to fungus, non-hydroscopic and electrically nonconductive. Suitable compounds include type ELC-4480 fixing mastic sealant made by Electrolyte Corporation, Danbury, Conn.

The strain jacket 22 tightly binds a plurality of optical fibers that form a bundle of optical fibers 23. Optical fibers usable in the present invention include conventional single-mode fibers, dispersion-shifted single-mode fibers, 50 micron multimode fibers, 62.5 micron multimode fibers, 100 micron multimode fibers, or 250 micron fibers. It is believed that optical fibers with diameters of about 250 microns are particularly suitable for use in the present invention. Typically, such optical fibers come from the manufacturer coated with a very thin layer of acrylate during manufacture. This acrylate coating, which is incorporated by the manufacturer of the optical fibers and does not form a part of the present invention, may be considered a first or primary coating.

In the preferred embodiments, the individual fibers of the optical fiber bundle 23 are treated by "upjacketing" with a secondary coating prior to formation of a bundle, with each bundle having a plurality of fibers. Optical fibers having a diameter of 250 microns are typically increased in diameter to about 400 microns by coating with a secondary coating layer of about 150 microns of silicone prior to assembly of a bundle. Preferably, the silicone secondary coating has coloring for identification and fiber differentiation purposes. However, and more significantly for the advantages of the present invention, the silicone coating provides thermal insulation for the optical fibers as well as a cushion or buffer for each individual fiber, thereby making the fibers more resistive to compressive forces.

In prior art "loose tube" constructions, about seventy (70%) percent of the space within a buffer tube (typically extruded around the fiber bundle) is filled with lubricating filling compound or jelly to facilitate movement of the fibers. Even with the larger fiber sizes used in the preferred embodiments (up to 400 microns when coated), the overall effect in the present invention is the accommodation of more fibers per unit area than loose tube constructions. It will thus be appreciated that for a 3.0 mm diameter channel 21, up to nineteen 250 micron optical fibers, each fiber having a 150 micron coat of silicone, can be accommodated, for a total of 57 for a three-channel cable.

It will be understood that plastic and other types of coatings may also be employed for upjacketing. Moreover, it will be understood that, preferably, optical fibers from different manufacturers should not be placed in the same cable or mixed, and not contain any factory splices. Preferably, the colors and tolerances are in accordance with EIA-359A, Standard Colors for Color Identification and Coding. The color formulation should be compatible with the fiber coating and strain jacket filling compound 24 and be heat stable.

The strain jacket 22 is extruded along the length and about the circumference of the bundle 23 such that the optical fibers are completely and firmly enclosed by the strain jacket. The strain jacket 22 thermally insulates the fiber bundle 23 from elevated temperatures caused by fault currents, protects the fiber bundle from environmental hazards, absorbs radial compressive forces, and prevents axial relative movement between fibers. The prevention of relative movement between the fibers also prevents chafing of the fibers with respect to each other. The preferred strain jacket is extruded around the bundle of optical fibers 23 at a relatively high temperature and assumes a shrink fit around the bundle upon cooling to ambient temperature. The strain jacket 22 is preferably a pliable, thermally insulating, weather-resistant, and temperature-resistant material such as a silicone-based material or an ethylene propylene-based material which can resist temperatures up to about 300° C. However, persons skilled in the art will recognize that other pliable, thermally insulating, weather-resistant, and temperature-resistant materials are available to protect the bundle 23 from environmental hazards.

It will be appreciated that because the optical fibers are tightly held within the strain jacket 22 and the strain jacket is tightly sealed in the channel 21, preferred embodiments of the present invention do not possess an elongation window such as is provided in the Oglesby et al. patent referenced above.

A strain jacket 22 with up to six fibers preferably has an outside diameter of 2.5±0.05 mm (0.098±0.002 inches), and an average wall thickness of 0.40+0.076/−0.025 mm (0.016+0.003/−0.001 inches). A jacket and bundle with up to nineteen fibers preferably has an outside diameter of 3.0±0.10 mm (0.118±0.004 inches), and an average wall thickness of 0.41+0.076/−0.025 mm (0.016+0.003/−0.001 inches). Overall diameters of up to about 3.5 mm are specifically contemplated.

It will be understood at this juncture that many, if not all, optical fibers available for telecommunications use especially in the United States are manufactured and sold with an acrylate coating for sealing of microcracks. Those skilled in the art will understand that acrylate has a melting point of about 180° C., and that the integrity of the acrylate coating will be compromised if the optical fibers are subjected to temperatures in excess of this value. Accordingly, the present invention specifically contemplates use of such acrylate coated fibers. The silicone coating for each individual fiber in combination with the insulating properties of the material of the strain jacket provides superior thermal insulation for acrylate coated fibers up to about 300° C., and thereby allows, for cable manufactured in accordance with the present invention, higher fault current ratings than certain prior art designs.

It will now be appreciated that the minimum wall thickness of the strain jacket 22 is that required to provide sufficient insulating performance (i.e., to protect the acrylate coating on the fibers from temperatures of up to 300° C. in the metal of the cable by keeping the temperature of the fibers at less than 180° C.) for applications utilizing the maximum number of fibers that can be placed in a single channel 21 (nineteen for 3.0 mm channel in the disclosed embodiment). On the other hand, a much greater wall thickness (with excess insulating capability) may be utilized in applications involving fewer than the maximum number of fibers, with the objective being to fill the available space in the channel 21 so that the strain jacket 22 and its enclosed bundle of fibers 23 can be immobilized in the channel.

The strain jackets 22, being tightly bound about the bundle of optical fibers 23, do not provide much if any space for receiving any type of strain jacket filling compound. Since the ability for the fibers to move relative to one another is specifically not provided for in the present invention, and indeed, since the tight binding of the strain jacket about the optical fiber bundle and tight binding of the strain jacket within the channels 21 prevents such movement, it is not believed important to provide any type of filling compound in the strain jackets 22. Accordingly, preferred embodiments of the present invention specifically omit any type of filling material in the strain jackets 22. However, if desired, the interstices of the strain jackets may be flooded with a filling compound to minimize water entry and migration. The filling compound should be compatible with all the components and should absorb and/or inhibit generation of free hydrogen within the cable.

The strength members 25 comprise at least one layer of stranded electrical conductors that completely encloses the core conductor 20 and thereby also completely cover each jacketed bundle 23 tightly mounted within each channel 21. The stranded electrical conductors 25 provide high current carrying capacity for the discharge of fault current from lightning strikes and the like. The strength members 25 provide the principal mechanical support for the fiber optic groundwire 10 and provide strain relief for the tensional forces along the axis of the fiber optic groundwire 10.

The preferred strength members comprise continuous aluminum clad steel concentric-lay-stranded metallic wires with the outer layer having left hand lay, with wires that conform to ASTM B415. The stranded wires may be of multiple layers, with a combination of various metallic wires within each layer. The direction of lay is preferably reversed in successive layers. The wires are preferably stranded so that when the complete cable 10 is cut, the individual wires can be readily regrouped and then held in place by one hand.

The length of lay of the various layers of strength member 25 wires is $13\frac{1}{2}$ times the outside diameter of that layer, but the length of lay is preferably not be less than 10 or more than 16 times this diameter. Preferred lay lengths are as follows:

12 No. 10 AWG = 6.75 in.(+1.25/−1.75 in.)
10 No. 8 AWG = 7.50 in.(+1.36/−1.96 in.)
12 No. 8 AWG = 8.50 in. (+1.50/−2.15 in.)

The rated breaking strength of the completed cable 10 may be taken as 90 percent of the sum of the rated breaking strengths of the individual wires, calculated from their nominal diameters and the appropriate specified minimum tensile strengths.

Because a fiber optic groundwire 10 constructed in accordance with the present invention is typically installed as a cable suspended between two or more support towers and above base electrical conductors of an electrical power transmission network, the combination of the helical winding of strain jacket 22, the tight binding of the fiber optic bundle 23 within the pliable strain jacket 22, and the firm mounting of the strain jacket 22 within the grooved channel 21, protects the optical fibers from the axial tension along the aluminum-clad steel wires 25 and the core conductor 20. For example, as the installed cable 10 flexes in the wind or during thermal expansion and contraction, the entire cable including the tightly bound strain jacket 23 and bundle of fibers 23 tends to radially untwist within the tight confines of the channel 21. Of course, the strength members 25 limit the extent of movement, and the strain jackets 22 experience radially compressive forces. This spring-like twisting effect protects the optic fiber bundle 23 from axial tension.

At this juncture, it is appropriate to discuss the effect of lay length on the amount and type of tension suffered by the optical fibers. A lay length of the channel 21 and strain jacket 22 (which of course are the same) that is too short will have the effect that a torsional force is imposed on the fibers in the bundle, because of the excess length of strain jackets and optical fibers per unit length of cable. Torsion or twisting also shortens the life expectancy of optical fibers. On the other hand, a lay length that is too long will have the effect that more axial tension is experienced by the fibers in the bundle, since the transformation of tension to radial compression will not occur. Preferred embodiments have lay lengths for the channel 21 as follows for the indicated size of strength members:

12 No. 10: 75.0±5.0 mm (2.95 in.±0.2 in.)
10 No. 8: 75.0±5.0 mm (2.95 in.±0.2 in.)
12 No. 8: 80.0±5.0 mm (3.15 in.±0.2 in.)

The foregoing lay lengths have been found to provide a satisfactory compromise between axial tension and torsion on the optical fibers and satisfactory operation in accordance with the present invention.

It will be further understood that the twisting motion of the bundle 23 occurs because the core 20 that supports the bundle 23 is also flexing, thereby twisting each of the helical channels 21, in response to the stresses placed upon the core 20 and the strength members 25. Thus, the pliability of the material of the strain jacket 22 permits the bundle 23 to flex and absorbs some of the radially compressive forces, as tensional and vibrational forces occur on the groundwire 10. In this manner, axial strain on the core conductor 20 and the aluminum-clad steel wires 25 are mechanically decoupled from the axial strain on the bundle of optical fibers 23. Thus, the present inventors believe that the expected estimated lifetime of each optical fiber within the bundle 23 is increased by this reduction of stress and strain upon the bundle.

More specifically, tension relief for each optical fiber within the bundle 23 is provided along the directional axis of the helix-form provided by the jacketed bundle 23 firmly mounted within each helically-wound channel 21. As the cable flexes, each firmly mounted strain jacket 22 also flexes radially and effects a spring-like action. Similarly, the optical fibers within the bundle 23 also flex radially, despite the tight binding provided by the strain jacket 22, because the strain jacket 22 is a pliable material that absorbs compressive forces applied to the bundle 23 within the strain jacket 22.

Stated in other words, the twist of the core 20, with the strain jacket 22 and fiber optic bundle 23 tightly bound into the channel 21, with transformation of axial stress by "unwinding" into radial compressive force which is partially absorbed by the material of the pliable strain jacket, by the silicone coating on the fibers, and by lay length, all combined to protect the individual fibers as the cable is tensioned during installation and other stresses. Although the fiber does tend to move within the channel, it moves slowly, toward the center of the core 20, because it is twisted around the core, and the optical fibers are elongated as the core experiences untwisting forces. The elongation as the fibers is absorbed by the various elements described—pliable strain jacket, silicone fiber coating, and lay length.

The present inventors believe that a fiber optic groundwire cable constructed in accordance with the present invention, having an overall diameter of 0.635 inches (16.13 mm), with twelve No. 8 AWG (0.1285 inch) wires as strength members 25, has a rated breaking strength of 27,300 lbs, a rated fault current of about 208 kiloamperes (Ka) per square inch per second, a weight of 0.563 lbs. per foot of length, with a modulus of elasticity of $17.8 \times 10^6$, a coefficient of linear expansion of $13.6 \times 10^{-6}$ per degree Celsius, a cross sectional area of 0.230 square inches (148.4 sq. mm), a nominal DC resistance of 0.12 $\Omega$ per thousand feet at 20 degrees Celsius, and can support a fiber count of 2 to 19 fibers per channel, with each of three channels being 3.0 mm in diameter.

Figure 4:
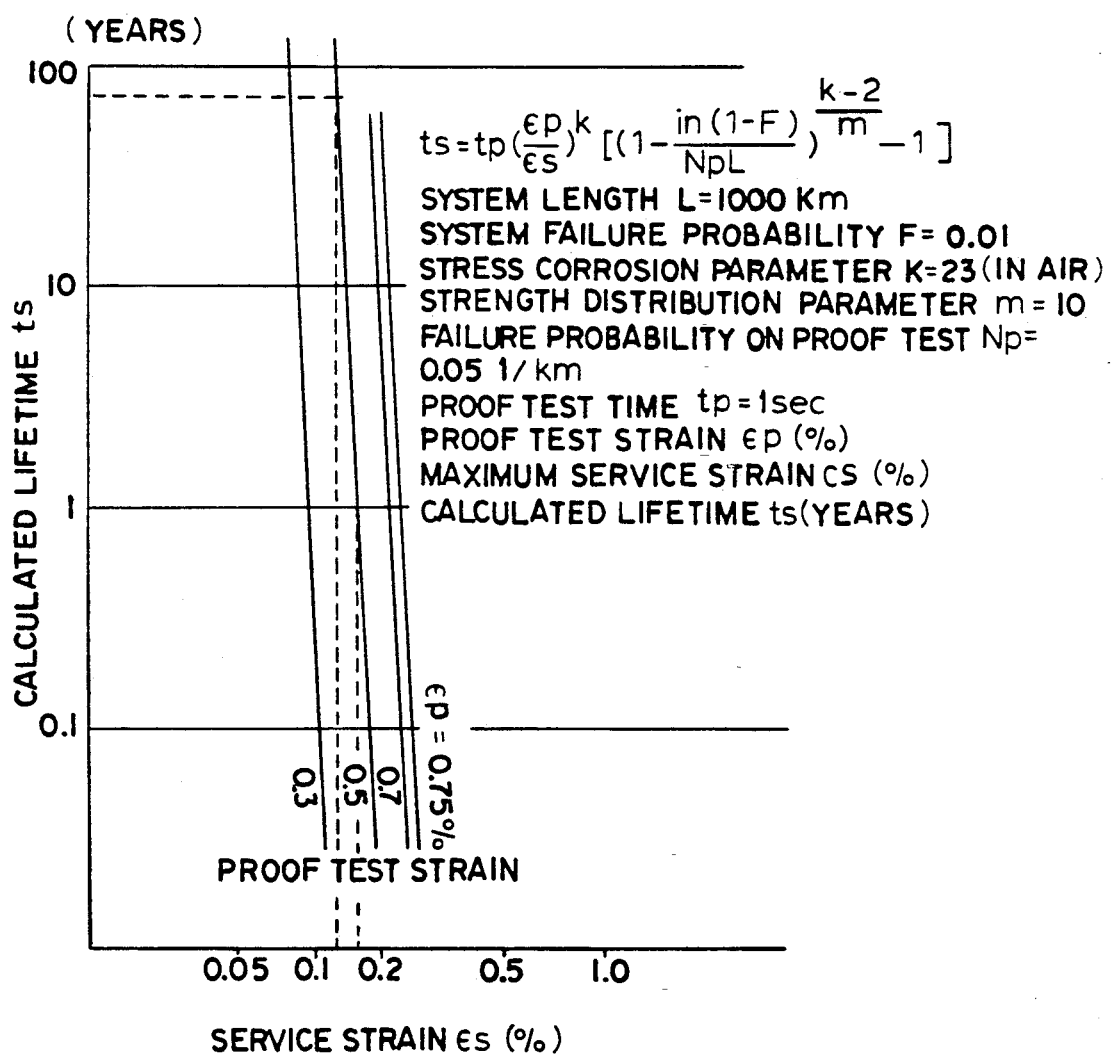
FIG. 4 illustrates the relationship between the maximum service strain on an optical fiber such as the type employed in the preferred embodiments of the present invention and the calculated optical fiber lifetime for selected proof test strains.

Referring now to FIG. 4, it will be seen that the lifetime estimation of a proof-tested optical fiber for a maximum service strain of about 0.17% and a proof-test strain of 0.5% is approximately one year. However, for a fiber optic groundwire constructed in accordance with the present invention, it has been theoretically determined that the maximum service strain is reduced to approximately 0.12%; therefore, for a proof-test strain of 0.5%, the estimated expected lifetime of the proof-tested fiber is approximately within the 60- to 80-years range. The decoupling of the axial strain from the optical fiber strain for the installed fiber optic groundwire 10 provides this increase in the estimate expected lifetime of the proof-tested fiber.

FIG. 5 illustrates the relationship between optical fiber strain to electrical conductor cable strain, for a twelve fiber embodiment of the dual-purpose groundwire cable 10 constructed in accordance with the present invention. It will be noted that the relationship is not a linear one-to-one relationship. Instead, the optical fiber strain is less than the cable strain for all cable strains above about 0.2%. Therefore, for high levels of cable strain, the tight binding of the optical fiber 23 within the pliable strain jacket 22, firmly affixed into the helical channel 21 of the core 20, provides significant decoupling of the fiber strain from the conductor cable strain.

It will now be appreciated that a fiber optic groundwire 10 constructed in accordance with the present invention is able to carry an increased fault current level during a fault condition when compared to prior art "loose tube" constructions. This increased current level capability is provided by the insulating properties of the thickness and material of the strain jacket 22 that tightly binds the bundle of optical fibers 23, and, to a degree, by the silicone secondary coating applied to the individual fibers prior to forming a bundle of fibers. Because the preferred strain jacket 22 is preferably either a insulating silicone material or a rubber material and has a thickness of about 0.40 mm, the strain jacket 22 thermally insulates and protects the fiber optic bundle 23 from the temperatures generated by fault currents, and permits a higher current rating for the cable. Considering that certain prior art "loose tube" fiber optic groundwires such as described in the Dey et al. and Oglesby et al. patents referenced hereinabove are rated at 160 Ka per square inch per second, a fiber optic groundwire 10 constructed in accordance with the present invention may be rated at about 208 Ka per square inch per second, thereby providing approximately 30–40% additional current carrying capability.

It will still further be appreciated that because the strain jacket 22 tightly binds the bundle of optical fibers 23 in close proximity to one another, without requiring lubricating strain jacket filler material that allows movement of the fibers, a fiber optic groundwire 10 constructed in accordance with the present invention allows an increased optical fiber count per strain jacket, for a given cross sectional area of channel 21. More specifically, the preferred fiber optic groundwire 10 provides an increased fiber count for the depth D because the optical fibers within the bundle 23 are tightly bound and thus, the usable fiber space within depth D is completely utilized; unlike the prior art, the preferred fiber optic groundwire 10 does not require the bundle of optical fibers 23 to be loose within the grooved channel 21. Also, the fiber optic groundwire 10 does not require the use of a gel or grease to fill the strain jacket 22 for housing the bundle of optical fibers 23 loosely within the strain jacket.

For the embodiments shown in FIGS. 1, 2, and 3, the strain jacket 22 tightly binds six 250 micron optical fibers that surround a central 250 micron optical fiber, for a total of seven fibers per bundle 23 per channel 21. Other embodiments contemplate a strain jacket 22 that tightly binds twelve optical fibers which surround six optical fibers that further enclose a central optical fiber, for a total of 19 fibers per bundle per channel. Those skilled in the art will recognize that the present invention is not limited to the embodiment disclosed above. Thus, a fiber optic groundwire 10 constructed in accordance with the present invention can accommodate up to 57 total 250 micron fibers in a three-channel design; the comparable prior art design containing optical fibers loosely held within the channel can accommodate a maximum of only 27 total fibers.

The present invention has been described in relation to particular embodiments which were intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A fiber optic groundwire, comprising:
a central core including at least one helical channel along the length of said core;
at least one strain jacket firmly affixed within said channel, said strain jacket is affixed within a grooved channel by completely filling said grooved channel containing said strain jacket with a filling compound comprising a fixing mastic sealent;
a plurality of optical fibers tightly bound within each said at least one strain jacket; and
at least one layer of stranded strength members wound about said core.

2. The fiber optic groundwire of claim 1, wherein said strength members comprise electrical conductors.

3. The fiber optic groundwire of claim 2, wherein said layer of stranded strength members comprises aluminum-clad steel wires.

4. The fiber optic groundwire of claim 1 wherein said core comprises a solid aluminum conductor.

5. The fiber optic groundwire of claim 1 wherein said strain jacket is extruded along the length and around a bundle of optical fibers formed by said plurality of optical fibers.

6. The fiber optic groundwire of claim 5, wherein said strain jacket is extruded around said bundle of fibers at a relatively high temperature and assumes a shrink fit around said bundle upon cooling to ambient temperature.

7. The fiber optic groundwire of claim 1, wherein said strain jacket comprises a pliable thermally insulating material having an overall diameter of between about 2.5 mm and about 3.5 mm.

8. The fiber optic groundwire of claim 7, wherein said strain jacket comprises a silicone-based material.

9. The fiber optic groundwire of claim 7, wherein said strain jacket comprises an ethylene propylene-based material.

10. The fiber optic groundwire of claim 1, wherein each of said plurality of optical fibers comprises an optical fiber having a diameter about 250 microns and a primary coating.

11. The fiber optic groundwire of claim 10, wherein said primary coating comprises acrylate.

12. The fiber optic groundwire of claim 10, wherein each fiber in said bundle of optical fibers includes a secondary coating prior to formation of said bundle.

13. The fiber optic groundwire of claim 12, wherein said secondary coating comprises a colored silicone coating about 150 microns thick.

14. The fiber optic groundwire of claim 1, wherein the lay length of said helical channel in said central core is between about 2 and about 7 inches.

15. A fiber optic groundwire, comprising:
an electrically conducting core including at least one grooved channel helically-wound along the length of said core;
a strain jacket firmly mounted within each channel such that said strain jacket is located completely within said channel, said strain jacket being mounted to said grooved channel by completely filling said grooved channel with a filling compound comprising a fixing mastic sealent;
a plurality of optical fibers tightly bound within each strain jacket, each of said optical fibers having a primary coating;
a secondary coating on each fiber in said plurality of optical fibers of a predetermined thickness; and
at least one layer of stranded electrical conductors surrounding said core.

16. The fiber optic groundwire of claim 15, wherein said core comprises a solid aluminum conductor.

17. The fiber optic groundwire of claim 15, wherein said strain jacket is extruded along the length and about the circumference of a bundle of optical fibers.

18. The fiber optic groundwire of claim 15, wherein said strain jacket comprises a pliable thermally insulating material having an overall diameter of between about 2.5 mm and about 3.5 mm.

19. The fiber optic groundwire of claim 18, wherein said strain jacket comprises a silicone-based material.

20. The fiber optic groundwire of claim 18, wherein said strain jacket comprises an ethylene propylene-based material.

21. The fiber optic groundwire of claim 15, wherein said layer of stranded electrical conductors comprises aluminum-clad steel wires.

22. The fiber optic groundwire of claim 15, wherein each of said plurality of said optical fibers comprises an optical fiber having a diameter of about 250 microns and wherein said primary coating is acrylate.

23. The fiber optic groundwire of claim 22, wherein said secondary coating comprises a colored silicone coating about 150 microns thick.

24. In a fiber optic groundwire comprising an electrically conducting core including at least one grooved channel helically-wound along the length of said core, a plurality of optical fibers in a bundle in said channel, each of said optical fibers including a primary coating of acrylate for sealing microcracks, and at least one layer of stranded electrical conductors surrounding said core as strength members, the improvement comprising:
- a thermally insulating, pliable strain jacket formed about said bundle of optical fibers and firmly affixed within each channel with a fixing mastic sealant; and
- a secondary coating having a predetermined thickness on each fiber in said bundle of optical fibers.

25. The improvement of claim 24, wherein each fiber in said bundle of fibers is positioned in close juxtaposition with other fibers in said bundle such that the fibers are not loose within said strain jacket.

26. The improvement of claim 24, wherein said strain jacket is extruded along the length and about the circumference of said bundle of optical fibers prior to placement in said channels.

27. The improvement of claim 24, wherein said strain jacket has an overall diameter of between about 2.5 mm and about 3.5 mm and carries from 2 to 19 optical fibers.

28. The improvement of claim 24, wherein said strain jacket comprises a silicone-based material.

29. The improvement of claim 24, wherein said strain jacket comprises an ethylene propylene-based material.

30. The improvement of claim 24, wherein said secondary coating comprises a colored silicone coating about 150 microns thick.

31. The improvement of claim 24, wherein said pliable strain jacket has a thickness of about 0.40 mm.

32. A fiber optic groundwire, comprising:
- a central core including at least one helical channel along the length of said core;
- at least one thermally insulating, pliable strain jacket firmly affixed within said channel, said strain jacket having an overall diameter of between about 2.5 mm and 3.5 mm;
- a plurality of optical fibers tightly bound within each said at least one strain jacket; and
- at least one layer of stranded strength members wound about said core.

33. The fiber optic groundwire of claim 32, wherein said strain jacket comprises a silicone-based material.

34. The fiber optic groundwire of claim 32, wherein said strain jacket comprises an ethylene propylene-based material.

35. A fiber optic groundwire, comprising:
- an electrically conducting core including at least one grooved channel helically-wound along the length of said core;
- a thermally insulating, pliable strain jacket firmly mounted within each channel such that said strain jacket is located completely within said channel, said strain jacket having an overall diameter of between about 2.5 mm and 3.5 mm;
- a plurality of optical fibers tightly bound within each strain jacket, each of said optical fibers having a primary coating;
- a secondary coating on each fiber in said plurality of optical fibers of a predetermined thickness; and
- at least one layer of stranded electrical conductors surrounding said core.

36. The fiber optic groundwire of claim 35, wherein said strain jacket comprises a silicone-based material.

37. The fiber optic groundwire of claim 35, wherein said strain jacket comprises an ethylene propylene-based material.

* * * * *